May 13, 1952 W. SIX ET AL 2,596,612

SIGNAL RECEIVER FOR CARRIER-WAVE TELEPHONY SYSTEMS

Filed July 20, 1946

INVENTORS.
WILLEM SIX
HUGO GERRIT BELJERS
JAN TE WINKEL
BY Fred M Vogel
AGENT.

Patented May 13, 1952

2,596,612

UNITED STATES PATENT OFFICE 2,596,612

SIGNAL RECEIVER FOR CARRIER-WAVE TELEPHONY SYSTEMS

Willem Six, Hugo Gerrit Beljers, and Jan te Winkel, Eindhoven, Netherlands, assignors to Hartford National Bank and Trust Company, Hartford, Conn., as trustee Application July 20, 1946, Serial No. 685,143
In the Netherlands June 12, 1943

Section 1, Public Law 690, August 8, 1946
Patent expires June 12, 1963

3 Claims. (Cl. 175—320)

Figures 1, 2, 3, 4, 5, 6, 7:
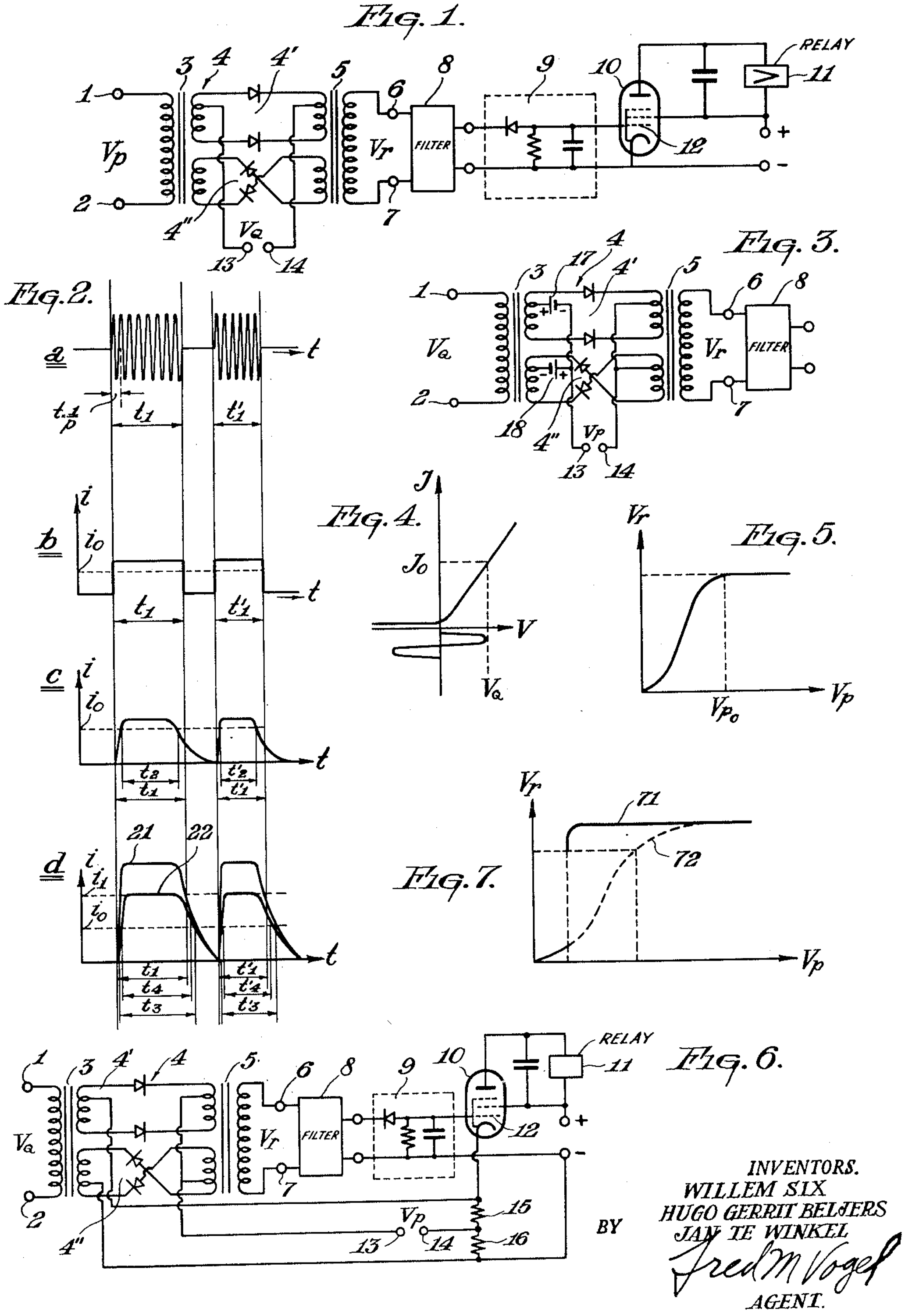

This invention relates to a signal receiver for a carrier-wave telephony system in which the signals are transmitted by transmitting the carrier-wave which is suppressed during the transmission of speech, the receiver comprising a single or a double push-pull modulator. The received signals and an auxiliary oscillation are supplied to the modulator in such a manner that the received signals are converted into oscillations of a lower frequency which are separated by a filter and, after being demodulated, control a relay.

To establish communication between telephone exchanges, it is necessary in telephone systems to transmit signals, for example call impulses and dialing impulses. In carrier-wave telephony systems such signalling frequently is achieved by so-called carrier-wave signalling. In this case the speech is transmitted as a side-band of a carrier-wave modulated by the speech, whereas the other side-band and the carrier-wave are suppressed. The signalling occurs by transmitting the carrier-wave which in this case is modulated by impulses occurring in a definite cadence. The signals are received in a signal receiver which must be so selective that it can respond only to the signals but cannot respond to the oscillations received during the transmission of speech. The required selectivity of the signal receiver can often be obtained only with difficulty by means of filters alone, since the relative frequency difference between the carrier-wave and the speech side-band is very small, particularly when the carrier frequency is high. Consequently the received oscillations are at first converted to a lower frequency by means of a single or a double push-pull modulator which has, in addition, supplied to it an auxiliary oscillation of different frequency. In this case a filter having only a low selectivity is needed to prevent the signal receiver from being actuated during the transmission of speech. In a well-known signal receiver the alternating voltage impulses thus selected and used for signalling are demodulated and control a relay which is consequently energized or deenergized in the cadence of the signal impulses. Now, it will appear hereinafter that the time during which the relay is energized or deenergized is dependent upon the amplitude of the alternating-voltage impulses received, which may result in errors in signalling. Such errors may be avoided by limiting the received oscillations. The object of the invention is to provide a circuit arrangement by which a limitation is obtainable in a simple manner.

The invention makes use of a push-pull modulator of the type in which a first wave is applied in parallel to two link circuits, and in which a second wave is applied to the two link circuits in such manner as differentially to load the rectifiers thereof, thereby giving rise to an output oscillation which has a frequency equal to the difference of the frequencies of the two waves referred to.

Conventionally, the first carrier wave (applied to the link circuits in parallel) is a received wave or input signal, generally of variable amplitude, while the second wave is a locally generated oscillation, generally of constant amplitude. The result of such an arrangement is an output oscillation the amplitude of which varies within wide limits, being a function of the amplitude of the input signal.

According to the present invention, amplitude limitation is obtained by applying a local oscillation of constant amplitude to the two link circuits in parallel while applying the input signal differentially to the pairs of rectifiers of the link circuits, the rectifiers being preferably biased negatively to render the input wave substantially ineffective to produce an output unless its amplitude exceeds a limit determined by the bias. According to another feature of the invention, the bias is made variable in dependence upon the amplitude of the output oscillation in such manner as to decrease the bias upon rising amplitudes, thereby making the system unstable until the output amplitude has reached a predetermined maximum.

In order that the invention may be clearly understood and readily carried into effect, it will now be exlained more fully with reference to the accompanying drawing forming a part of the specification and in which:

Fig. 1 is a schematic diagram of a known signal receiver,

Fig. 2 is a representation of the signal wave forms with which the invention is concerned, Fig. 3 is a schematic diagram illustrating the basic concept of a device according to the invention, Fig. 4 and Fig. 5 are diagrams illustrating operating characteristics of the device according to the invention, Fig. 6 is a schematic diagram of a preferred embodiment of the invention, and Fig. 7 is a diagram illustrating the operating characteristics of the device illustrated in Fig. 6.

Figure 1 shows a known signal receiver of the type frequently used for signalling in carrier-wave telephony. The alternating voltage impulses $v_p$ having a frequency $p$ which are used for signalling, are supplied to terminals 1, 2 of an input transformer 3.

Figure 2*a* shows such a signal consisting of alternating voltage impulses. The signals are supplied in phase opposition to the rectifiers of a double push-pull modulator 4. The rectifiers have supplied to them, in addition an alternating voltage $v_q$ having a constant amplitude and a frequency $q$. The fundamental frequency of the signal derived from the terminals 6, 7 of the output transformer 5 and consisting of alterating-voltage impulses is $p-q$ c./s. The frequency $q$ is generally chosen such that the frequency $p-q$ of the modulated output signal is 8000 c./s. Then follows a filter 8 which only passes the frequency $p-q$. The oscillations passed by the filter are demodulated by a demodulator 9 and control the anode current of a tube 10, whose anode circuit includes a relay 11. This relay may switch in, for instance, a lamp in the receiving telephone exchange, whereby the desire of the transmitting exchange to establish a communication is indicated. In the transmission of dialing impulses it is of great importance, in order to avoid faulty communications, that the times during which the relay is energized or deenergized should exactly correspond to the duration of the transmitted alternating voltage impulses. This will be the case when the current $i$ flowing through the relay has the same variation with time as the enveloping curve of the alternating voltage impulses (see Figure 2*b*). Since the received alternating-voltage impulses shown in Figure 2*a* and the oscillations derived therefrom by frequency-changing comprise not only the frequencies $p$ and $p-q$ respectively, but also a great number of harmonics, it would be necessary, in order that the current traversing the relay may exhibit the same variation as the alternating-voltage impulses received, that all these harmonics should be supplied to the detector 9. However, since the filter 8 only transmits oscillations having the frequency $p-q$ and suppresses the harmonics, the signal taken from the detector and supplied to the control-grid 12 of tube 10 and, consequently, also the relay current, will exhibit the variation shown in Figure 2*c*, which differs from the enveloping curve of the received impulses shown in Figure 2*a*. If $i_0$ is the value of the current at which the relay 11 is energized or deenergized, the relay will be energized or deenergized only during the time $t_2$ (Figure 2*c*) instead of during the correct time $t_1$ (Figure 2*b*) owing to the distortion caused by the filter. If the amplitude of the received signals consisting of alternating voltage impulses is larger, the current traversing the relay acquires the shape shown in Figure 2*d* by curve 21, and the time during which the relay responds has become longer i. e $t_3$ sec. Consequently, the duration of the impulses is distorted in a manner depending on the amplitude of the received alternating-voltage impulses. It will be clear from the following consideration that the amplitude of the impulses taken from the output terminals 6, 7 of the push-pull modulator is dependent upon the amplitude of the received impulses supplied to the input terminals 1, 2.

In the arrangement of Figs. 1 and 6 the output of the modulator, represented by the resultant oscillation $v_r$ of frequency $p-q$, actually operates to drive the grid of tube 10 negative, thereby reducing or interrupting the relay current in step with the impulses received. It is, however, obvious that by the use of a simple inverter, for example, the conditions illustrated in Fig. 2 can be obtained, and that the relay or responsive device 11 may be arranged to respond effectively either to current maxima or to current minima.

Figure 4 shows the characteristic of a rectifier of the push-pull modulator and shows the current I flowing through the rectifier as a function of the voltage $v$. The alternating voltage $v_q$ of constant amplitude, supplied to the terminals 13, 14 shown in Figure 1, produces a current (max. $I_0$) through the rectifiers during each half-period, but since the rectifiers are arranged in push-pull, no alternating voltage will be produced at the output terminals 6, 7. Conditions are different, however, with the alternating voltage impulses supplied at the same time to the terminals 1, 2. These impulses can be transmitted by the good conductivity of the rectifiers. It is evident that, if the amplitude of the alternating voltage $v_q$ is large with respect to that of the alternating voltage impulses $v_p$, the amplitude of the resulting impulses $v_r$ taken from the output terminals 6, 7 is substantially proportional to that of the alternating voltage impulses. Consequently, the period of time during which the relay is energized or deenergized is strongly dependent upon the amplitude of the received signal.

According to the invention, this drawback is avoided by the arrangement shown in Figure 3 in which the alternating voltage $v_q$, having a constant amplitude and a frequency $q$, is supplied to the terminals 1, 2 of the input transformer 3, whereas the received alternating voltage impulses are supplied in the same phase via the terminals 13, 14 to the rectifiers of the push-pull modulator 4, each of which is negatively biased, for example, by means of batteries 17 and 18.

If, now, the amplitude of the received alternating voltage impulses is considerably larger than the negative bias, the rectifiers will be conductive almost during the whole half-period. Owing to the push-pull connection, these alternating voltage impulses do not produce any voltage between the output terminals 6, 7. During the time in which the rectifiers are conductive the alternating voltage induced in the secondary windings of transformer 3 by input voltage $v_q$, however, is rectified and the resulting pulsating voltage applied to transformer 5. Consequently, the amplitude of the alternating voltage impulses $v_r$ taken from the output terminals 6, 7 is solely dependent on the amplitude on the alternating voltage $v_q$ supplied to the input terminals 1, 2. By maintaining the amplitude of $v_q$ constant, it is thus ensured that the amplitude of the alternating voltage impulses taken from the output terminals 6, 7 has a constant value. As can be seen from Figure 2*d*, curve 22, for a definite amplitude of the alternating voltage impulses taken from the terminals 6, 7 and, consequently, for a definite value $i$ of the relay current, the time during which the relay is energized or deenergized will be the interval $t_4$ which, while lagging slightly behind time $t_1$, is similar to $t_1$ in its duration.

The relationship between the amplitude of the local oscillation $v_q$, the negative bias applied to the rectifiers, and the amplitude of the input wave $v_p$ can be ascertained in simple manner from the following consideration: As long as the amplitude of the input wave is less than the bias, the currents induced in both link circuits 4', 4'' of the modulator 4 by the locally generated wave will be small, being essentially determined by the high resistance of at least one rectifier operating on the horizontal portion of its characteristic (see Fig. 4); these currents will be of substantially equal magnitude and will traverse the primaries of output transformer 5 in a sense to neutralize each other. Currents may also pass through the impedance (not shown but connected between terminals 13, 14) across which the input wave $v_p$ is developed, these latter currents being however attenuated by this impedance. Accordingly, the resultant output $v_r$ will be of relatively low amplitude, as illustrated by the first portion of the curve $v_r/v_p$ shown in Fig. 5. As the amplitude of $v_p$ increases, peaks of one polarity of this wave will load the rectifiers of circuit 4' in such sense as to have them operate on the positive part of their characteristic during increasing portions of a cycle of wave $v_q$, and the same will be true for circuit 4'' during peaks of the opposite polarity, this situation is represented by the steeper part of the curve in Fig. 5. Finally, when the amplitude of $v_p$ exceeds the bias by a voltage which is greater than the peak voltage of wave $v_q$ (as developed across each secondary of input transformer 3), the length of the said cycle portions of wave $v_q$ can no longer increase, so that the amplitude of output wave $v_r$ remains at a constant value $v_{ro}$ represented by the horizontal portion of the curve $v_r/v_p$ in Fig. 5. It will be seen that the amplitudes of $v_r$ vary rapidly between a lower limit (represented by the lower bend of the curve in Fig. 5), determined by the bias applied to the rectifiers, and an upper limit ($v_{ro}$) determined by the amplitude of wave $v_q$, the corresponding amplitude of input wave $v_p$ being indicated at $v_{po}$. Thus, the constant amplitude of the alternating voltage supplied to the input terminals 1, 2 must be chosen such that the amplitude of the alternating voltage impulses $v_r$ attains their ultimate value $v_{ro}$ at a desired signal strength.

A further improvement may be obtained by making the negative bias of the rectifiers dependent upon the current flowing through the relay, as is shown in Figure 6. In the circuit-arrangement shown in Figure 6, the negative bias is taken from resistors 15, 16 included in the anode circuit of tube 10. The polarity of the detector has been chosen such that, with an increase in signal strength from a definite value of the amplitude of these alternating voltage impulses supplied to the terminals 13, 14, the voltage set up at the control-grid 12 and, consequently, the anode current, decreases. This results in a decrease of the negative bias developed across resistors 15, 16. The conductivity of the double push-pull modulator increases, due to which the grid voltage decreases still further. Consequently, the action has become unstable and the amplitude of the alternating voltage impulses transmitted will, at a definite signal strength, change over to the constant value determined by the amplitude of the alternating voltage supplied to the terminals 1, 2. The relation which exists between the amplitudes of the modulator output and the received alternating voltage impulses is shown in Figure 7, curve 71. Up to a definite value $a$ of the alternating voltage impulses received ($v_p$) the amplitude of the modulator output ($v_r$) is small. Above this value the amplitude of the output changes-over abruptly to the constant value. In this manner a high sensitivity of the circuit-arrangement is obtained for the alternating voltage impulses received.

Curve 72 in Fig. 7 shows, for comparison, an arrangement according to Fig. 6 but with constant bias (hence comparable to that of Fig. 3), this curve being therefore similar to the curve of Fig. 5. It has been stated above that an increase in the amplitude of wave $v_p$ above a definite value drives the grid 12 of tube 10 more negative, this value being indicated at $a$ in Fig. 7 and corresponding to the lower limit (lower bend of curve 72) referred to in connection with Fig. 5. If $c$ is the value of the amplitude of output $v_r$ at which the relay 11 will be operative (i. e. release), $c$ being slightly less than $v_{ro}$, then the amplitude of $v_p$ would have to be $b$ in an arrangement such as that of Fig. 3 but need only be $a$ in the system of Fig. 6. It will thus be seen that, with the latter system, the two limits have been effectively compressed into a single critical value $a$ above which the output of the modulator is substantially constant, thus establishing the current through relay 11 at a predetermined value as discussed in connection with Fig. 2$d$.

Any oscillations having frequencies differing from $p-q$ c./s. which, for instance, originate from speech, will be strongly attenuated by the filter 8. Accordingly, it would be necessary for the amplitude of output $v_r$ to rise high above the values shown in Figs. 5 and 6 to produce a sufficient change in the potential of grid 12 to actuate the relay 11. Since, however, the amplitude of $v_r$ has an upper limit $v_{ro}$ which is substantially independent of the amplitude of the input wave, protection from actuation of the relay 11 by speech currents is reasonably assured.

What we claim is:

1. A signal receiver for a suppressed carrier wave telephony system, comprising a push-pull modulator comprising a plurality of rectifiers and an output circuit, means to apply a received signal voltage to the rectifiers of said modulator in phase coincidence, a source of auxiliary oscillations having a substantially constant amplitude, means to apply said auxiliary oscillations to the rectifiers of said modulator in phase opposition to produce in said output circuit an output signal voltage having a frequency lower than the frequency of said received signal voltage, filter means coupled to said output circuit and adapted to pass the frequency of said output signal voltage, utilization means including a relay coupled to the output of said filter means and responsive to said output signal voltage, said utilization means being adapted to decrease the current flowing through said relay upon an increase in amplitude of said output signal voltage, means responsive to the current flowing through said relay to produce a negative bias voltage varying in amplitude in a discontinuous manner inversely proportional to the amplitude of said output signal voltage, and means to apply said negative bias voltage to the rectifiers of said modulator in a polarity opposing conduction in said rectifiers.

2. A signal receiver for a suppressed carrier wave telephony system, comprising a push-pull modulator comprising a plurality of rectifiers and an output circuit, means to apply a received signal voltage to the rectifiers of said modulator in phase coincidence, a source of auxiliary oscillations having a substantially constant amplitude, means to apply said auxiliary oscillations to the rectifiers of said modulator in phase opposition to produce in said output circuit an output signal voltage having a frequency lower than the frequency of said received signal voltage, filter means coupled to said output circuit and adapted to pass the frequency of said output signal voltage, utilization means comprising a detector element comprising a unilateral impedance coupled to said filter means, an electron discharge tube amplifier having a grid coupled to said detector element, an anode and a cathode and a relay coupled to the anode of said discharge tube amplifier and responsive to the anode current of said discharge tube amplifier, said utilization means being adapted to decrease the current flow through said relay upon an increase in amplitude of said output signal voltage, means responsive to the current flowing through said relay to produce a negative bias voltage varying in amplitude in a discontinuous manner inversely proportional to the amplitude of said output signal voltage, and means to apply said negative bias voltage to the rectifiers of said modulator in a polarity opposing conduction in said rectifiers.

3. A signal receiver for a suppressed carrier wave telephony system, comprising a double push-pull balanced modulator comprising a plurality of rectifiers arranged to cooperate in pairs and an output circuit, means to apply a received signal voltage to the rectifiers of said modulator in phase coincidence, a source of auxiliary oscillations having a substantially constant amplitude, means to apply said auxiliary oscillations to the rectifiers of said modulator in phase opposition to produce in said output circuit an output signal voltage having a frequency lower than the frequency of said received signal voltage, filter means coupled to said output circuit and adapted to pass the frequency of said output signal voltage, utilization means comprising a detector element comprising a unilateral impedance coupled to said filter means, an electron discharge tube amplifier having a grid coupled to said detector element, an anode and a cathode and a relay coupled to the anode circuit of said discharge tube amplifier and responsive to the anode current of said discharge tube amplifier, said utiliaztion means being adapted to decrease the current flowing through said relay upon an increase in amplitude of said output signal voltage, means comprising a plurality of series connected resistance elements interposed in the anode cathode circuit of said discharge tube amplifier to produce a plurality of negative bias voltages varying in amplitude in a discontinuous manner inversely proportional to the amplitude of said output signal voltage, and means to apply said negative bias voltages to respective pairs of rectifiers of said modulator in a polarity opposing conduction in said rectifiers.

WILLEM SIX.
HUGO GERRIT BELJERS.
JAN TE WINKEL.

REFERENCES CITED

The following references are of record in the file of this patent:

UNITED STATES PATENTS

| Number | Name | Date |
|---|---|---|
| 1,831,516 | Stewart | Nov. 10, 1931 |
| 2,048,100 | Burnside | July 21, 1936 |
| 2,210,968 | Wirkler | Aug. 13, 1940 |
| 2,211,040 | Wirkler | Aug. 13, 1940 |
| 2,296,107 | Kimball | Sept. 15, 1942 |
| 2,363,288 | Bell | Nov. 21, 1944 |
| 2,397,884 | Rhodes | Apr. 2, 1946 |
| 2,424,971 | Davey | Aug. 5, 1947 |

OTHER REFERENCES

Serial No. 374,956, Stumpers et al. (A. P. C.), published May 18, 1943.